United States Patent Office 3,288,871
Patented Nov. 29, 1966

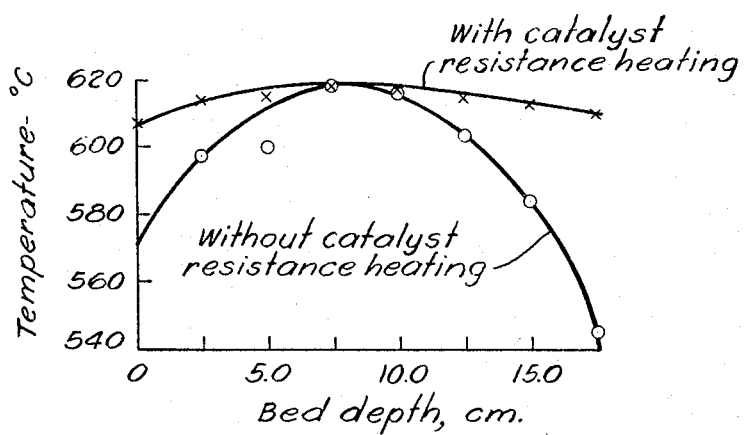
CATALYST TEMPERATURE GRADIENT

3,288,871
CATALYTIC DEHYDROGENATION OF HYDROCARBONS
Frederick J. Soderquist, Essexville, Harold D. Boyce, Coleman, and Paul E. Kline, Midland, Mich., assignors to The Dow Chemical Company, Midland, Mich., a corporation of Delaware
Filed Aug. 7, 1963, Ser. No. 300,607
10 Claims. (Cl. 260—669)

This invention relates to a process for the preparation of vinyl monomers by catalytic dehydrogenation of hydrocarbons in the presence of a self-regenerative catalyst based on iron or zinc oxide. More particularly, it relates to such a process wherein the catalyst bed is heated by passing an electric current through the catalyst.

In the usual commercial preparation of vinyl monomers by the catalytic dehydrogenation of hydrocarbons, such as the preparation of styrene from ethylbenzene or of 1,3-butadiene from n-butenes, a mixture of vaporized hydrocarbon and steam is contacted with a heterogeneous solid catalyst at an elevated temperature. The well-known self-regenerative catalysts described by Kearby in Ind. and Eng. Chem., 42, 298 (1950) and in numerous patents are particularly suitable for this dehydrogenation process. These catalysts usually contain in major proportion one or more oxides of iron, magnesium, or zinc as the major active component with a minor amount of a basic material such as potassium oxide or potassium carbonate to promote removal of carbon from the catalyst surface through reaction with the steam diluent. Prior to the development of such regenerative catalysts, the build up of carbon on the catalyst surface as a result of thermal decomposition of a portion of the hydrocarbon stream at the elevated dehydrogenation temperature, made it necessary to take the catalytic unit off stream frequently to remove the inactivating carbon deposits.

Since the dehydrogenation reaction is strongly endothermic, the use of steam in the feed mixture serves not only to reduce the partial pressure of the vaporized hydrocarbon and to control the carbon contamination of the regenerative catalyst, but also as an effective and necessary source of heat. Even though superheated steam is a highly efficient source of heat, the problem of maintaining a desired uniform temperature throughout many cubic feet of catalyst in a large commercial reactor is both critical and difficult. Often it is necessary to employ several sources of heat. Thus, large reactors often are complex structures with additional means of heating the catalyst bed from externally circulated superheated steam, molten salts, or hot combustion gases.

The problem of heat transfer becomes even more acute in the preparation of difunctional monomers such as divinylbenzene from diethylbenzene. For such monomers, the required heat of reaction is about twice that needed for a monovinyl compound. Because of this, elaborate and expensive reactor designs and/or extremely large volumes of superheated steam are generally required. Also a reactor designed for the production of styrene cannot generally be operated efficiently to produce divinylbenzene without major modifications.

It has now been discovered that, in a process for the preparation of vinyl monomers by the catalytic dehydrogenation of a steam-diluted hydrocarbon feed in the presence of self-regenerative metal oxide catalysts of certain compositions, improved results can be obtained by passing an electric current through the catalyst to provide at least a portion of the heat required to maintain the desired catalyst temperature. More particularly, it has been found that, after brief use in the dehydrogenation of a steam-diluted hydrocarbon feed, self-regenerative catalysts containing as initially prepared a major proportion of iron oxide and/or zinc oxide have an electrical resistance such that passing an electric current through the catalyst can provide efficient and effective supplemental heating. Thus, operation with smaller amounts of superheated steam is possible. Furthermore, it has been most unexpectedly discovered that such electrical heating not only provides a flexible means for supplemental heating of the catalyst bed but also results in a highly advantageous and desirable, more uniform bed temperature.

The more uniform catalyst bed temperature is clearly illustrated in the accompanying figure which shows the temperature profile of a catalyst bed being used to dehydrogenate ethylbenzene. Under normal operating conditions without catalyst resistance heating, a temperature gradient of about 50°–75° C. was observed from the midpoint of the catalyst bed to each end. By passing an electric current through the catalyst so that resistance heating supplied an appreciable portion of the heat required to maintain the same midpoint temperature, the gradient was reduced to only 10°–15° C. without any other change in operating conditions. This greater temperature uniformity was reflected in the product composition. For example, with a midpoint temperature of 618° C. the crude yield of styrene was increased from 32.4 percent without catalyst resistance heating to 38.4 percent with catalyst resistance heating.

In accord with the present invention, the steam-diluted hydrocarbon feed is contacted with a catalyst bed heated at least in part by passing an electric current through the catalyst. Normally, the desired catalyst temperature is in the range from about 500° to 750° C. Dehydrogenation occurs during contact of the hydrocarbon vapors with the heated catalyst surface and is not directly effected by the mode of heating. However, because of the more uniform catalyst temperature achieved within the catalyst bed when direct electric resistance heating of the catalyst is employed, the overall efficiency of the process is improved. Also through closer control to desired steady state conditions, decomposition of the hydrocarbons from overheating is minimized.

It is evident that effective electrical resistance heating of a catalyst bed by passing a current through the catalyst depends critically on the electrical resistance of the catalyst itself. A large resistance requires high voltages to provide the needed current flow through the catalyst whereas a low resistance requires a high current flow to achieve a desired heat input. This factor, the electrical resistance of a conductor, is commonly expressed in terms of a resistivity ($\rho$) defined by the standard equation:

$$\rho = RA/l$$

wherein $R$ is the observed resistance in ohms, $A$ is the cross-sectional area of the conductor, and $l$ is its length.

Thus, an important factor of the present invention is the discovery that certain regenerative catalysts develop and maintain under dehydrogenation conditions a resistivity such that effective resistance heating can be achieved with simple electrode arrangements and with moderate voltages and currents. More particularly, it has been found that self-regenerative catalysts of the indicated composition develop after brief use a resistivity of from about 0.1 to 30 ohm-centimeters at a normal operating temperature in the range from about 500°–750° C. By way of comparison, the resistivity of pure iron oxide ($Fe_2O_3$) at 700° C. is about 1,000 ohm-centimeters. To illustrate this point further, the resistivity of an unused, commercially available, pelleted catalyst of the self-regenerative type which contained by analysis 88.1 weight percent $Fe_2O_3$ was found to range from about 4,500 ohm-centimeters at 600° C. to about 1,200 ohm-centimeters at 700° C. After this catalyst was used to dehydrogenate ethylbenzene to styrene for a few hours, the resistivity had dropped to about 5.0 ohm-centimeters at an operating temperature of 625° C. Furthermore, it remained at this level for an extended period of use.

Although the geometry of the catalyst bed and the location of the electrode plates in contact with the catalyst are further vital factors in determining the current and voltage requirements of a given reactor, a catalyst with a resistivity in the range from about 0.1 to 30 ohm-centimeters generally permits effective resistance heating with an input voltage of less than 110 volts and a current density of from about 0.05 to 1.0 ampere per square centimeter without major changes in conventional reactor design except for addition of electrodes in contact with the catalyst bed. It is possible by resistance heating of these catalysts to provide a major portion of the heat input required at normal flow rates. Such electric resistance heating can be advantageously used to supplement heating with superheated steam thereby permitting a lower ratio of steam to hydrocarbon feed stream, or providing greater flexibility in the use of a reactor with feed streams having different thermal requirements.

The exact cause of the marked change in catalyst resistivity with brief use is not known. Yet, it is probable that this change is related to the development of a thin coating of carbon on the surface and within the microstructure of the catalyst. The essentially uniform resistivity of the self-regenerative catalyst for extended operating periods subsequent to the initial rapid change suggests that the carbon coating remains fairly constant. Evidently a steady state is established between deposition of carbon by thermal decomposition of the feed and its removal by reaction with steam. The phenomenon is, however, complex. The physical state and distribution of the carbon on and within the catalyst particles is a critical factor. Very appreciable carbon coatings were obtained in the dehydrogenation of ethylbenzene with an activated alumina or a self-regenerative catalyst based on magnesium oxide. However, the resistivity of these latter catalysts decreased only gradually and did not reach, even after use for more than 100 hours, the essentially constant level observed with the iron oxide or zinc oxide regenerative catalysts.

The greater uniformity observed when electrical resistance heating is employed to provide at least a portion of the necessary heat of reaction is believed also to be related to the carbonization of the catalyst. Carbon deposits are known to build up in the cooler portions of the catalyst bed where the reaction with steam is slower. As a result, the resistivity of the catalyst in these portions drops. With an applied electric potential this automatically increases the flow of current and hence the resistance heating until a more uniform temperature is obtained throughout the catalyst bed. But regardless of the exact nature of this control means, electrical resistance heating clearly provides a highly desirable, more uniform temperature within the catalyst bed.

In the practice of the invention described herein, one or more pairs of electrodes are placed in firm contact with the catalyst bed. These electrodes can be of any suitable shape and can be mounted horizontally, vertically, or in any other way to achieve a desired cross-sectional area and distance between each electrode pair. The resistivity of the catalyst is such that the electrodes can be separated by 10–50 centimeters or more if desired. With a vertical, fixed catalyst bed, it is often convenient to employ one electrode as the base support for the catalyst and to place the second in firm contact with an upper portion of the catalyst bed. Obviously, the catalyst and electrodes must be electrically insulated from other parts of the reactor.

Self-regenerative catalysts containing, as initially prepared, a major proportion of iron oxide (calculated as $Fe_2O_3$), zinc oxide, or mixtures thereof can be employed. Most advantageously, catalyst containing more than about 75 weight percent iron oxide and/or zinc oxide are used. The steady state resistivity and the catalytic activity of catalysts containing less than a major proportion of these oxides are inadequate for effective use in the process described herein. A new, unused catalyst must be conditioned by several hours of actual use in the presence of water and hydrocarbon vapors before its resistivity reaches a steady state level suitable for resistance heating. Then the desired electric potential can be applied to achieve resistance heating of the catalyst with concurrent adjustment of the feed stream and other heating means as required to achieve desired throughputs and conversions.

This improved process can be used with mono- and polyalkylbenzene containing at least one $C_2$–$C_3$ alkyl group as, for example, ethylbenzene, ethyltoluene, cumene, diethylbenzene and diisopropylbenzene. Also, the process may be employed for the preparation of 1,3-butadiene from 1- or 2-butene and isoprene from 2-methyl-2-butene.

In practice, the mole ratio of water to hydrocarbon in the reactor feed ranges from about 6.0 to 30 or more. Also, the catalyst temperature and space velocity of the feed are adjusted in the standard manner to maintain a desired conversion of about 20 to 50 percent and preferably about 40 percent. In the preparation of styrene from ethylbenzene, a catalyst temperature of from about 550° to 650° C. is common. More generally, the process is operable within a temperature range from about 500° to 750° C. and with a pressure of from about 0.25 to 3 atmospheres. Within the general scope of the invention described herein, optimum reaction conditions for a particular system can be easily determined by those skilled in the art by a few preliminary runs.

The following examples illustrate further the invention described herein, but are not to be construed as limiting the scope. Unless otherwise specified, all parts and percentages are by weight.

EXAMPLE 1.—RESISTIVITY OF SELF-REACTIVATING $Fe_2O_3$ CATALYST

A small reactor was prepared by mounting a fused quartz tube with an inside diameter of about 1.9 cm. vertically in a two section electric furnace. The catalyst was contained in the lower section between two perforated stainless steel retention plates with a bed depth of about 15 cm. Each plate had a diameter of 1.9 cm. and contained 8 holes 0.3 cm. in diameter. To provide electric contact with the plates, a stainless steel rod was fastened to the center of each plate and extended through a seal at each end of the reactor tube. Also, by means of an external tension device connected to the top rod, the upper plate was held in firm contact with the catalyst bed with a plate pressure of about 45 p.s.i. (3 kg./cm.$^2$). The upper part of the quartz tube was packed with Berl saddles to serve as a vaporizing and preheating section. Suitable feed devices were provided to deliver water and hydrocarbon in separate metered streams to the top of the reactor tube and means for condensing and recovering the product were connected to the bottom outlet. Generally, the upper section was maintained at a temperature of about 400°–500° C. to vaporize and preheat the feed stream while the catalyst bed was heated to a temperature in the range from about 550° to 700° C. The exact catalyst temperature was adjusted to obtain the desired conversion as shown by analysis of the crude product, and thereafter maintained by automatic control of the external furnace.

A. The reactor was charged with 45 ml. of unused, $\frac{3}{16}$ inch O.D. pelleted catalyst of the self-regenerative type containing by analysis 88.1% $Fe_2O_3$, 8.1% $CrO_3$, 4.8% $K_2O$ and 0.8% $K_2CO_3$. Then without a feed stream the temperature of the catalyst bed was slowly increased to 660° C. Periodic measurements of the bed resistance between the retaining plates were made using a Wheatstone bridge. The resistance of the catalyst bed was about 25,000 ohms at 600° C., 10,000 ohms at 650° C. and 6,500 ohms at 700° C. From the known bed dimensions, the resistivity of this catalyst was calculated as about 4,500, 1,800, and 1,200 ohm-cm., respectively.

B. In another run with the same unused catalyst, water was fed to the reactor at a rate of 62 ml./hr. and the catalyst resistivity was found to range from about 1,900 ohm-cm. at 600° C. to 750 ohm-cm. at 650° C.

C. Another sample of fresh catalyst of similar composition was placed in the reactor and the temperature raised rapidly to 650° C. with steam flowing through the bed at the rate of 62 g./hr. The bed resistivity at 650° C. was about 250 ohm-cm. Ethylbenzene was then introduced at a rate of 20 g./hr. and the temperature adjusted by means of the external heater until about 40% conversion to styrene was obtained. Thereafter, the bed resistance was recorded every two hours for more than 90 hours of operation. Steady state conditions were reached within the first two hours of operation with a resistivity of about 4 ohm-cm. and 40% conversion at a catalyst temperature of 620°–630° C. The resistivity remained between 3.2 and 4.0 ohm-cm. throughout the balance of the run except when the catalyst temperature dropped to 610° C. for a brief period. The resistivity increased to 6.0 ohm-cm. at this point but returned to 4.0 ohm-cm. when the temperature was adjusted to 620° C.

D. After 90 hours of operation, the hydrocarbon feed was changed from ethylbenzene to diethylbenzene (17% ortho, 57% meta, 26% para). The catalyst temperature was adjusted until about a 35% conversion to divinylbenzene was obtained as indicated by a bromine value of approximately 80% (calculated as ethylvinylbenzene). Once steady state conditions were established for the desired conversion, a resistivity of from 0.37–0.56 ohm-cm. was consistently maintained for an operating period of more than 180 hours with a catalyst temperature of from 695° to 705° C.

These runs summarized in Table 1 clearly indicate the unexpected and marked change in catalyst resistivity when the self-regenerative $Fe_2O_3$ catalyst is heated in the presence of the water-hydrocarbon feed stream.

TABLE 2.—RESISTANCE HEATING OF $Fe_2O_3$ CATALYST

[Feed rate/hr.: 62 g. $H_2O$ and 20 g. diethylbenzene]

| Time, Hrs. | Cat. T., °C. | Percent Unsat.[a] | Voltage, volts | Current, amps. | Bed Resistance,[b] ohms |
|---|---|---|---|---|---|
| 4 | 702 | 81.5 | 4.0 | 1.6 | 2.5 |
| 20 | 698 | 82.8 | 4.0 | 1.6 | 2.5 |
| 24 | 696 | 86.1 | 7.0 | 3.4 | 2.1 |
| 50 | 671 | 77.5 | 7.6 | 2.9 | 2.6 |
| 122 | 670 | 74.5 | 7.5 | 2.7 | 2.8 |
| 126 | 685 | 82.5 | 9.8 | 4.0 | 2.5 |

[a] Calc. as ethylvinylbenzene.
[b] Calc. from voltage and current.

EXAMPLE 3.—CATALYST TEMPERATURE GRADIENT

A. About 45 ml. of a used $Fe_2O_3$ catalyst which had an initial composition similar to that described in Example 1, was placed in the reactor and used to dehydrogenate ethylbenzene in a feed stream of 32.1 grams of ethylbenzene and 62.8 grams of water per hour. The initial resistivity of the used catalyst was 4.5 ohm-cm. and in further use at a temperature of about 620° C. for 132 hours, this resistivity dropped slightly to 1.7 ohm-cm. The crude product contained an average of 32.4% styrene with a yield based on reacted ethylbenzene of 85.2%.

During the run the temperature gradient along the length of the catalyst bed was determined with a thermocouple. A typical temperature profile is given in the accompanying figure. Note that there is a temperature gradient of 50°–75° C. from the midpoint of the catalyst bed (618° C.) to the top (545° C.) and to the bottom (573° C.).

B. The catalytic dehydrogenation was continued for another 196 hours using the same feed stream but with electrical resistance heating of the catalyst bed. A potential of 8–9 volts was used and a midpoint catalyst temperature of about 618° C. maintained. The crude product contained 38.5% styrene with an average yield of 84.8%.

During the period of resistance heating of the catalyst bed a temperature gradient of only 10–15° C. was ob- TABLE 1.— RESISTIVITY OF SELF-REGENERATIVE $Fe_2O_3$ CATALYST

| Run | Feed [a] | Cat. T., °C. | Av. Conversion, percent | Catalyst Bed Resistance, ohms | Catalyst Resistivity, ohm-cm. |
|---|---|---|---|---|---|
| 1A | None | 650 | | 10,000 | 1,800 |
| 1B | $H_2O$ | 650 | | 4,200 | 750 |
| 1C-1 | $H_2O$ | 650 | | 1,400 | 250 |
| 1C-2 | $H_2O$ plus Ethylbenzene | 620–630 | 40 | 18–22 | 3.2–4.0 |
| 1D | $H_2O$ plus Diethylbenzene | 695–705 | 35 | 2–3 | 0.36–0.54 |

[a] Feed rates: water, 62 g./hr.; hydrocarbon, 20 g./hr.

EXAMPLE 2.—RESISTANCE HEATING OF $Fe_2O_3$ CATALYST

Dehydrogenation of diethylbenzene as described in Example 1D was terminated and the external Wheatstone bridge circuit removed and replaced by a variable E.M.F. source. Then using the same catalyst bed and feed ratios, the run was resumed and continued for another 126 hours with supplemental resistance heating of the catalyst from an applied potential across the reactor plates of from 4.0 to 9.8 volts. The external heat supplied to the catalyst bed was diminished as required to maintain the bed temperature necessary for a conversion to divinylbenzene of about 35%, i.e., about 80% unsaturation calculated as ethylvinylbenzene. Typical data obtained from this run are presented in Table 2.

served. Typically, temperatures ranged from 605°–610° C. at either end of the catalyst bed to 615°–620° C. at the midpoint. This more uniform temperature was reflected in the higher conversion to styrene, 38.5% vs. 32.4% without resistance heating, under otherwise similar conditions.

EXAMPLE 4.—WATER-HYDROCARBON RATIO

The influence of the water/hydrocarbon ratio was examined with another portion of the used $Fe_2O_3$ catalyst described in Example 3. Typical data given in Table 3 for continuous runs of at least 60 hours duration show no appreciable difference with weight ratios of water to ethylbenzene ranging from about 1.0 to 5.0 (a mole ratio of 6.0 to 30.0). Satisfactory dehydrogenation is also obtained with even higher ratios.

TABLE 3.—WATER/HYDROCARBON RATIO
[Fe₂O₃ catalyst]

| Run | Feed, g./hr. | | Catalyst | | Styrene | |
|---|---|---|---|---|---|---|
| | Water | Ethyl-benzene | T., °C. | ρ, ohm-cm. | Conversion, Percent | Yield, Percent |
| 4A | 36.5 | 31.4 | 648 | 2.9 | 38.4 | 83.1 |
| 4B | 93.4 | 32.2 | 620 | 3.2 | 40.3 | 84.2 |
| 4C | 157.5 | 32.0 | 627 | 2.9 | 38.4 | 83.1 |

EXAMPLE 5.—DEHYDROGENATION OF VARIOUS HYDROCARBONS

To establish operability in the dehydrogenation of various hydrocarbons, the resistivity of a standard unused $Fe_2O_3$ catalyst of the general initial composition described in Example 1 was determined with several hydrocarbons in separate runs of from 30–100 hours.

It is evident from the typical data presented in Table 4 that a resistivity suitable for electrical resistance heating of the catalyst bed is obtained with various hydrocarbons. It was also found that the recovered catalyst samples contained about 0.9 to 1.6 wt. percent carbon compared with an initial value of about 0.4 wt. percent. This increase is real even though analysis of the carbon content of the used catalyst is complicated by the presence of several forms of carbon, various amounts of metallic carbides, and carbonates, etc.

TABLE 4.—DEHYDROGENATION OF VARIOUS HYDROCARBONS
[Fe₂O₃ catalyst]

| Run | Hydrocarbon | Catalyst | | Vinyl Monomers | | |
|---|---|---|---|---|---|---|
| | | T., °C. | ρ, ohm-cm. | Product | Conversion, percent | Yield, per cent |
| 5A | Ethylbenzene | 616 | 1.3 | Styrene | 40.0 | 84.1 |
| 5B | Isopropylbenzene | 622 | 0.9 | α-Methylstyrene | 36.7 | 79.0 |
| 5C | Ethyltoluene | 650 | 1.6 | Vinyltoluene | 21.8 | 68.4 |
| 5D | Diethylbenzene | 685 | 1.4 | Divinylbenzene | 36.2 | 65.9 |
| 5E | 2-butene | 652 | 6.7 | 1,3-butadiene | 12.9 | 50.8 |

EXAMPLE 6.—RESISTIVITY OF OTHER SELF-REGENERATING CATALYSTS

In a manner similar to that described in Example 1, the resistance characteristics of a number of other dehydrogenation catalysts of the self-regenerative type were determined using about 45 ml. of each catalyst in the form of standard 3/16 inch O.D. extruded pellets. The initial resistivity of each catalyst was determined by heating the catalyst in the absence of feed to a temperature between about 600° to 650° C. Then, a preheated mixture of 1 part ethylbenzene and 2 parts water was introduced at the rate of about 95 g./hr. and the temperature of the catalyst bed adjusted to achieve about a 40% conversion to styrene. Each catalyst was run for a minimum of 120 hours with frequent determinations of the catalyst bed resistance. Data from a number of typical runs are presented in Table 5.

With self-regenerative catalysts containing a major portion of iron oxide and/or zinc oxide, the resistivity reached a steady state level in the range from about 0.1 to 30 ohm-cm. after a few hours use on stream. In contrast the magnesium oxide and the alumina catalysts showed only a very gradual decrease in resistivity without reaching a steady state level suitable for resistance heating even after prolonged continuous operation for as much as 450 hours (Run 5–6). Although most catalyst after use contained less than 4% carbon, the high magnesium oxide catalyst (Run 5–6) and the alumina catalyst (Run 5–7) contained, respectively, 18.8 and 14.7 wt. percent carbon. Obviously, the carbon content alone is not an adequate indication or explanation of the steady state resistivity observed with the iron and/or zinc oxide catalysts.

The resistivities of other regenerative catalysts containing a major portion of iron oxide and/or zinc oxide are also within the general limits described herein as suitable for use in catalyst reactors designed to provide at least a portion of the heat required to maintain a desired catalyst temperature by electric resistance heating of the catalyst.

We claim:
1. In a process for the preparation of vinyl monomers by the catalytic dehydrogenation of hydrocarbons in the presence of water vapor and a self-regenerative metal oxide catalyst, the improvement which comprises
    (a) using a self-regenerative metal oxide catalyst comprising in major proportion an oxide selected from the group consisting of iron oxide, zinc oxide and mixtures thereof, and
    (b) passing an electric current through at least a portion of said catalyst so that the catalyst itself becomes a resistance heating element and provides part of the heat required to maintain the desired catalyst temperature.
2. The process of claim 1 wherein the catalyst temperature is in the range from about 500° to 750° C.
3. The process of claim 1 wherein the catalyst has a steady state resistivity in the range from about 0.1 to 30 ohm-centimeters at the desired catalyst temperature in the range from about 500° to 750° C. as a result of being used for the catalytic dehydrogenation of a hydrocarbon in the presence of water vapor.

TABLE 5.—RESISTIVITY OF SELF-REGENERATIVE CATALYSTS

| Run | Major Catalyst Component ᵃ | T., °C. | Resistivity, ohm-cm. | | Styrene | |
|---|---|---|---|---|---|---|
| | | | Initial | Final | Conversion, Percent | Yield, Percent |
| 5-1 | 88.1% Fe₂O₃ | 616 | 220 | 1.2 | 40.0 | 84.1 |
| 5-2 | 87.9% ZnO | 653 | 220 | 2.9 | 38.7 | 81.9 |
| 5-3 | 44.0% Fe₂O₃+44.0% ZnO | 613 | 220 | 5.4 | 39.4 | 83.5 |
| 5-4 | 30.0% Fe₂O₃+30.0% ZnO | 638 | 100 | 25.2 | 38.7 | 81.0 |
| 5-5 | 17.1% Fe₂O₃+60.9% MgO | 635 | 235 | 70.0 | 36.3 | 78.4 |
| 5-6 | 87.9% MgO | 675 | 4,700 | 37.8 | 28.4 | 81.5 |
| 5-7 | 99% Al₂O₃ ᵇ | 700 | 14,000 | 75.5 | 18.9 | 68.0 |

ᵃ Initial composition.   ᵇ Non-self-regenerative.

4. The process of claim 1 wherein the catalyst as initially prepared contains at least 75 weight percent of an oxide selected from the group consisting of iron oxide, zinc oxide, and mixtures thereof.

5. The process of claim 1 wherein the hydrocarbon is a n-butene.

6. The process of claim 1 wherein the hydrocarbon is 2-methyl-2-butene.

7. The process of claim 1 wherein the hydrocarbon is an alkylbenzene containing at least one $C_2$–$C_3$ alkyl group.

8. The process of claim 7 wherein the alkylbenzene is ethylbenzene.

9. The process of claim 7 wherein the alkylbenzene is isopropylbenzene.

10. The process of claim 7 wherein the alkylbenzene is diethylbenzene.

References Cited by the Examiner

UNITED STATES PATENTS

| | | | |
|---|---|---|---|
| 1,400,959 | 12/1921 | Koetschet | 23—288 |
| 2,533,945 | 12/1950 | Legatski | 23—288 |

OTHER REFERENCES

Kearby: Industrial and Engineering Chemistry, vol. 42, No. 2, February 1950, pp. 295–300.

DELBERT E. GANTZ, *Primary Examiner.*

C. R. DAVIS, *Assistant Examiner.*